United States Patent

[11] 3,602,899

[72] Inventors Arwin B. Lindquist;
Wilbur D. Pricer; Robert R. Seeber, all of Poughkeepsie, N.Y.

[21] Appl. No. 844,713
[22] Filed June 20, 1969
[23] Division of Ser. No. 609,073, Jan. 13, 1967, Pat. No. 3,518,631
[45] Patented Aug. 31, 1971
[73] Assignee International Business Machines Corporation Armonk, N.Y.

[54] ASSOCIATIVE MEMORY SYSTEM WITH MATCH, NO MATCH AND MULTIPLE MATCH RESOLUTION
2 Claims, 7 Drawing Figs.

[52] U.S. Cl. .......... 340/172.5
[51] Int. Cl. .......... G11c 15/00
[50] Field of Search .......... 340/172.5, 173; 235/157

[56] References Cited

UNITED STATES PATENTS

| | | | |
|---|---|---|---|
| 3,328,769 | 6/1967 | Lee | 340/172.5 |
| 3,339,181 | 8/1967 | Singleton et al. | 340/172.5 |
| 3,388,382 | 6/1968 | Lee | 340/172.5 |
| 3,401,376 | 9/1968 | Barnes et al. | 340/172.5 |
| 3,402,394 | 9/1968 | Koerner et al. | 340/172.5 |
| 3,419,851 | 12/1968 | Burns | 340/172.5 |

*Primary Examiner*—Gareth D. Shaw
*Attorneys*—Hanifin and Jancin and Owes L. Lamb

ABSTRACT: An associative memory matrix having a writable portion made up of bistable memory cells and a read-only portion made up of monostable memory cells. The memory may be used as a conventional memory by placing an address in the address field of an entry register, masking out all other bits and performing a match interrogation with the unmasked bits. Since the contents of the address portion (read-only memory) of each stored word are unique, the interrogation results in a single match at the location containing the address sought.

Included is a circuit for determining whether no match, one match, or a multiple match has occurred.

INVENTORS
ARWIN B. LINDQUIST
WILBUR D. PRICER
ROBERT R. SEEBER

BY Owen Lamb
ATTORNEY

ASSOCIATIVE MEMORY SYSTEM WITH MATCH, NO MATCH AND MULTIPLE MATCH RESOLUTION

CROSS-REFERENCES TO RELATED APPLICATIONS

This is a division of application Ser. No. 609,073 filed Jan. 13, 1967 U.S. Pat. No. 3,331,912 issued July 18, 1967.

"A Monolithic Associative Memory Cell," by W. D. Pricer, filed Dec. 17, 1965, discloses the cross-coupled memory cell utilized in the associative memory matrix disclosed herein.

BACKGROUND OF THE INVENTION

This invention relates to computer memory systems and more particularly to associative memories wherein data may be accessed on the basis of content rather than physical location.

DESCRIPTION OF THE PRIOR ART

Associative memories are memories in which data may be accessed on the basis of content. Conventional memories are accessed by supplying an address which indicates the physical location of the desired data. In conventional memories the computer must keep track of where data is stored. In order to retrieve such data the computer program must specify the address at which the data is stored. In an associative memory the data may be retrieved by specifying the content of the data stored rather than its address.

In an associative memory it is sometimes desirable to address the memory as if it were a conventional memory. This may be referred to as the decoding function. It is also desirable when interrogating an associative memory to deliver to an output register a unique address representing the location of the data that matched during interrogation. This is referred to as the encoding function. The encoding function is particularly useful when the associative memory is used as a mapping device for dynamic storage allocation in a time-sharing system. If there is a one-to-one correspondence between the words of the associative memory and the storage addresses (pages) of the main memory then the unique address can be stored in the associative memory by using read-only storage cells permanently set to indicate the unique address. However, if there are less associative words than pages of main memory then these unique addresses will represent the addresses of only those memory pages currently identified by the associative memory. These unique addresses will then have to be stored in writable associative storage cells.

There may be more than one word or portion of a word which is identical to other words or portion of words stored in the memory. If an interrogation and simultaneous read function is performed on a word or a portion of a word which is duplicated at another location in the associative memory, a multiple match will occur. It is desirable to have an indication as to whether there were no words that match (0), one word that matched (1), or more than one word that matched (a plurality, P). A simultaneous read function is normally executed when one expects a unique match and therefore would like to avoid the delay required to resolve a multiple match. The 0, 1 or P indication is a very valuable function to have when performing an AMOR (Associative Memory with Ordered Retrieval) sort of the type described in U.S. Pat. No. 3,249,921 by A. B. Lindquist and R. R. Seeber issued May 3, 1966.

SUMMARY OF THE INVENTION

It is a paramount object of this invention to provide an associative memory capable of performing a decoding function, an encoding function and resolving multiple matches.

It is also an object of this invention to provide a logic circuit for resolving multiple match situations.

The above objects are accomplished in accordance with the invention by providing an associative memory matrix having a writable portion made up of bistable memory cells and a read-only portion made up of monostable or bistable memory cells. The memory is provided with an entry register and masking means for masking out certain portions of the entry register. In order to use the associative memory as a conventional memory an address is decoded by placing it in an address field of the entry register, masking out all other bits, and performing a match interrogation with the unmasked bits. Since the contents of the address field (read-only memory) of each word is unique, the interrogation results in a single match at the location containing the address sought. The matched word can then be read out in the same manner that a conventional memory is read.

In accordance with another aspect of the invention, a logic circuit is provided for resolving multiple matches.

Figure 2:
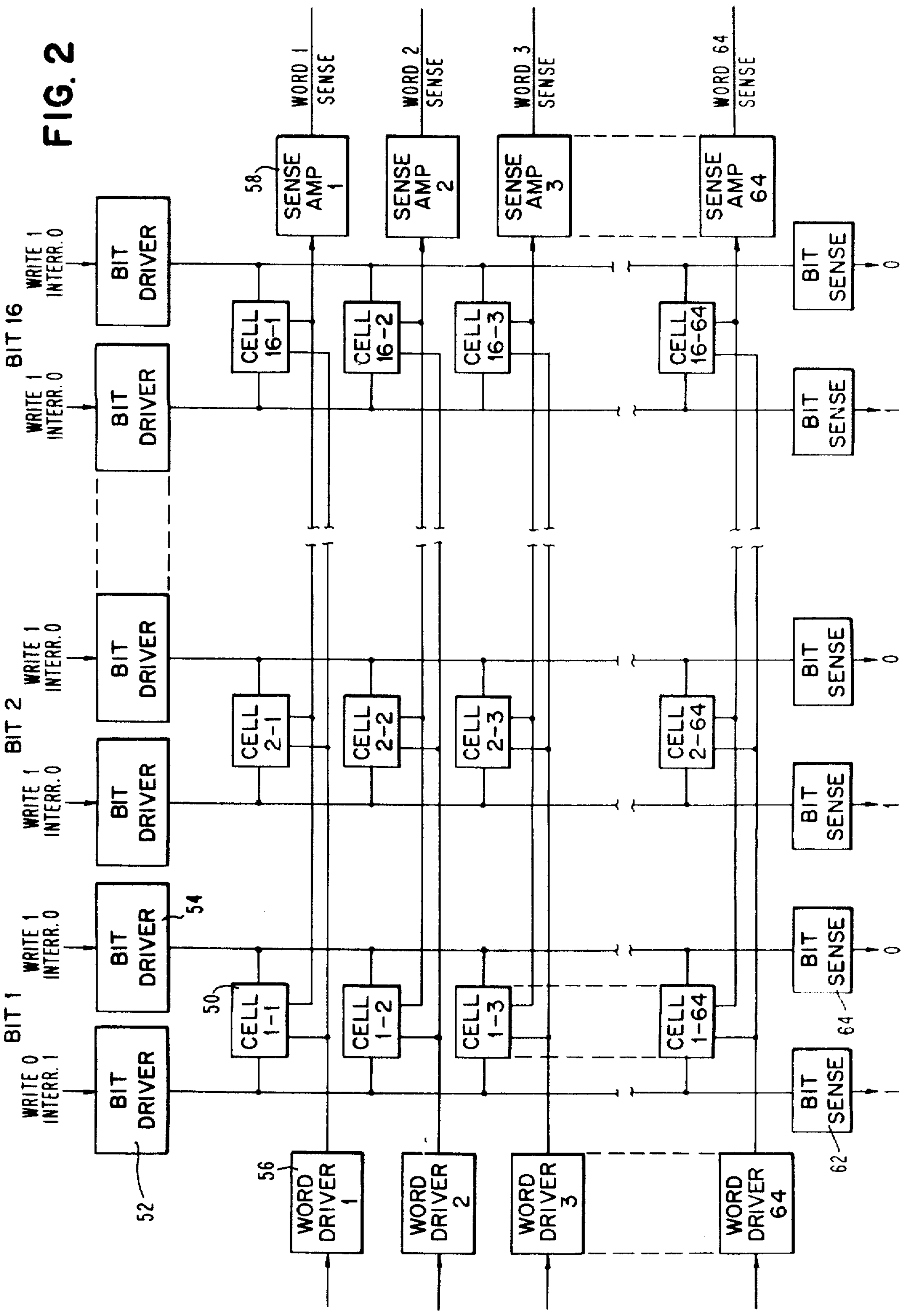
FIG. 2 is a more detailed logical block diagram of the associative memory array shown in FIG. 1.

FIGS. *4a–d* are schematic diagrams of read-only memory cells suitable for use in the associative memory array of FIG. 2.

DESCRIPTION OF THE PREFERRED EMBODIMENT

Figure 1:
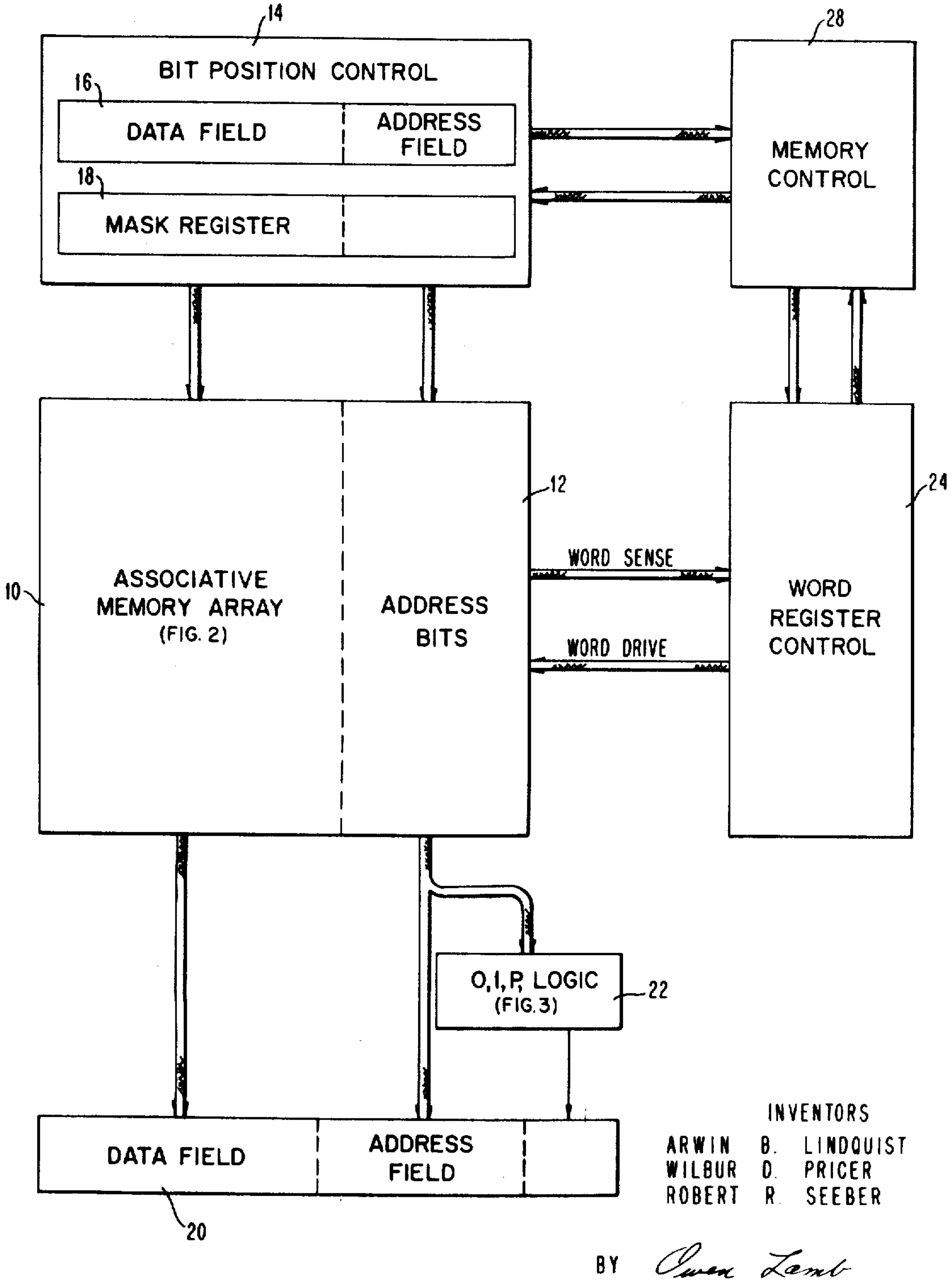
FIG. 1 is a block diagram of an associative memory system in which the invention is embodied.

Referring now to FIG. 1, the associative memory system includes an associative memory matrix having a writable portion 10 made up of bistable memory cells of the type described in the aforementioned Pricer application and a read-only portion 12 made up of monostable or bistable memory cells. The memory is controlled by a bit position control circuit 14 which includes an entry register 16 and a mask register 18 which can function to mask any selected position of the register 16. The outputs of the associative memory array are fed to a memory output register 20 which during a read operation receives data bits read from the memory 10, 12. Logic 22 is provided for determining whether no match, one match, or a plurality of matches occurred in the array. Word register control logic 24 and memory control logic 28 are provided for performing memory control functions.

The associative memory array 10, 12 is shown in more detail in FIG. 2. The array comprises a plurality of cells 50 which may be either writable or read-only storage cells. As shown in the aforementioned Pricer application, the cells 50 are driven by bit driver circuits 52, 54. Word driver circuits 56 are provided for each row of cells for selecting a particular row during a writing operation. Word sense amplifiers 58 are provided at each row for providing a word sense output during a read operation. In the embodiment shown the associative memory comprises 64 words of 16 bits per word. Some of these bits may comprise a read-only portion in which event the memory cells are read-only cells in that portion of the memory. As more fully described in the Pricer application, to write a one into any particular bistable cell it is necessary to energize the word driver for the particular row selected and the bit driver 54 for the particular bit position or column selected. Nondestructive readout is accomplished by energizing the word driver 56 alone thereby causing current through the already conducting transistor within the memory cell 50 to vary. Bit sense amplifiers 62 sense this variation. For an associative memory tag compare operation an interrogation for a one or a zero is performed by the bit driver. A sense amplifier 58 connected to the word line senses whether a "no match" has been achieved.

The address field bits 10–16 of the associative memory array shown in FIG. 2 16 comprise read-only storage bits. The read-only memory cells are shown in FIGS. *4a–d*. Signals for associative search are fed through the test 0 line to the word line but not from the test 1 line, or vice versa. Nondestructive readout is achieved by pulsing the word line positive and sensing current variations on the test 1 line. In both of these read-only applications the electrical characteristics are the same as for the read/write bistable memory cell. Therefore, the read-only cells may be intermixed with the read/write cells in the same memory. The read-only cell will simply ignore any write operations since they have no effect on the cell.

Figure 3:
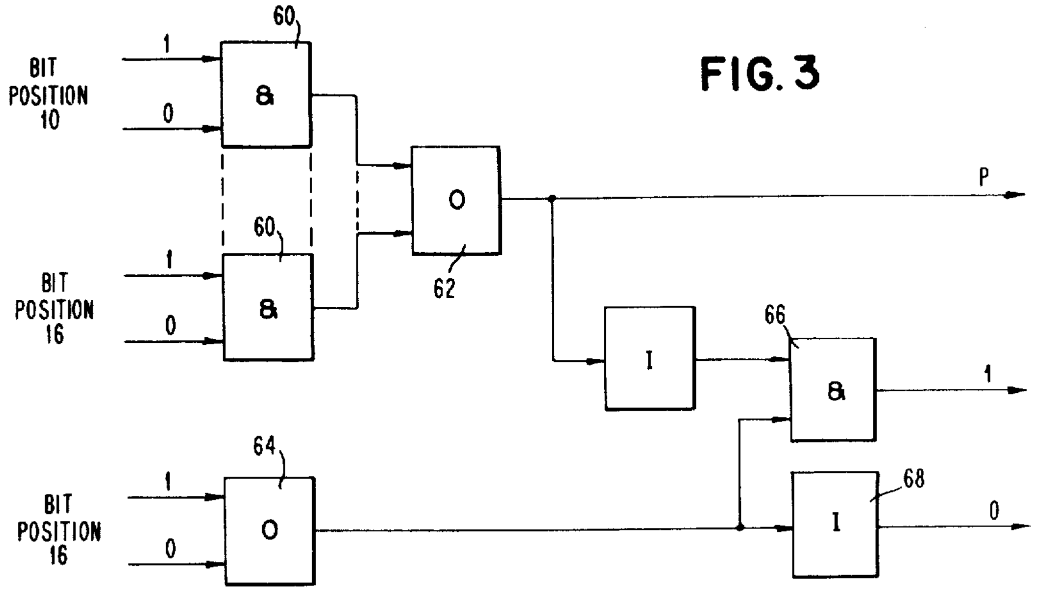
FIG. 3 is a more detailed logical block diagram of the zero, one or multiple match logic shown in FIG. 1.
Figure 4A:
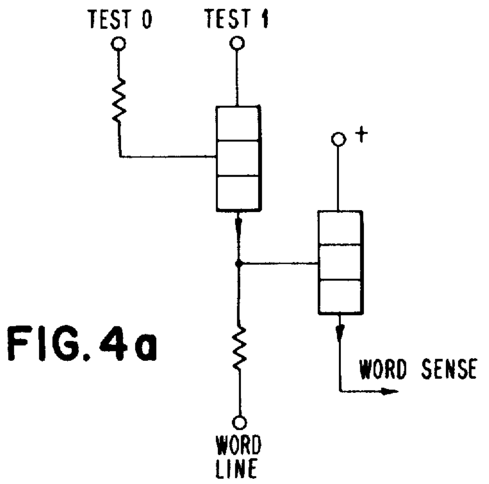
Figure 4B:
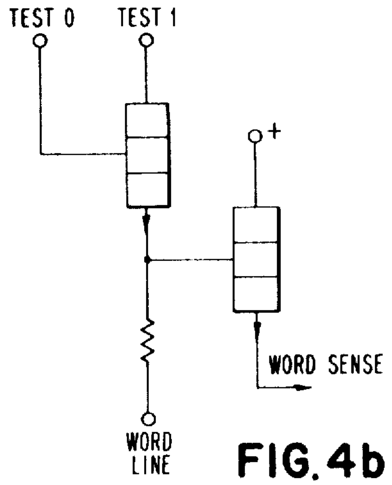
Figure 4C:
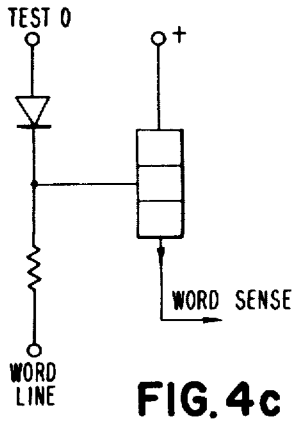
Figure 4D:
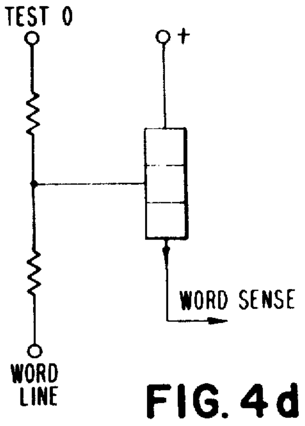

The 0, 1, P logic 22 of FIG. 1 is shown in more detail in FIG. 3. This logic performs the function of determining whether 1, 0 or a plurality of matches was achieved on a particular interrogation. This logic will be described in more detail after the description of the entire memory.

CONVENTIONAL ADDRESSING

Referring again to FIG. 1, if the associative memory is to be used as a conventional memory, an address can be decoded by placing the address in the address field of the entry register 16, and masking out all other bits with the mask register 18. Only the unmasked bit positions interrogate the associative memory array. Since the contents of the address field of each word are unique, the interrogation will yield only a single match. The matched word is then read out under control of the word register control 24 into the memory output register 20. Thus, the associative memory has operated as if it were a conventional memory.

ASSOCIATIVE ADDRESSING

To encode, or find the address of a specific piece of data, the associative memory array may be interrogated on the basis of content rather than on the basis of address. This is done by storing the data sought in the data field of the entry register 16. The mask register is used to mask out the address field and the associative memory 10 is interrogated by only the data field bits. The matched word is read out under control of word register control 24 into the output register. The address field of this register then contains the desired address. The address bits 12 in the associative memory array 10 may be read-only bits since these bits would never be changed when performing the functions just described.

RESOLVING MULTIPLE MATCHES

It is possible that the same information may be stored in the data field of two or more locations in the associative memory array. Or the information may not be stored at all in the associative memory array. In either of these cases it is necessary to be able to determine whether no match, one match or a plurality of matches occurred in the array. This function is performed by the logic 22 shown in FIG. 1 and in more detail in FIG. 3.

Interrogation for this data proceeds as follows. The data is stored in the data field of entry register 16. The mask register 18 is set to mask out the address field. Interrogation of the array 10 proceeds by the energizing of the 1 and 0-bit drivers of each column. Each nonmatching word position generates a pulse on the corresponding word line, which pulse resets the latch for that word row. Latches remain set in the word position in which the data matches the contents of entry register 16. A read operation is initiated by energizing word drivers in all word positions having the latch remaining on. The pulses on the word driver lines produce signals from the bit sense amplifiers 62, 64 for each address field position. For example, if word 2 matches the interrogation word and if bit one of this word is a "one," there will be a signal from bit sense amplifier 62 for bit position 1. If the data portion of more than one word is matched the address field bit sense lines will be activated each acting independently. Thus, if the data portions of word 1 and word 2 both match and address bit 1 of word 1 is 0, and address bit 1 of word 2 is 1, there will be a signal on both the "1"-bit sense amplifier in bit position 1 and "0"-bit sense amplifier or bit position 1. If these signals are logically combined as shown in FIG. 3, it can be determined whether 0, 1 or plurality of matching words exist. Thus, if both the 0- and 1-bit sense positions of any bit position are energized, one of the AND circuits 60 will be energized forcing an output from the OR circuit 62 which indicates a plurality of matching words. If any one or more word positions match the interrogating word, then all of its bit positions must have either a 1 or a 0 output from the bit sense amplifier 62, 64. If any one position does have a 1 or a 0 output, then a word has matched. In the logic shown in FIG. 3 only one-bit position 16 is necessary. The 1 and 9 outputs are ORed in OR circuit 64 which provides an output which indicates that at least one word position has matched the interrogating word. If the P-line (plurality of matched words) is not energized, an output from AND circuit 66 will occur indicating that only one word is matched. Because all of the address fields are unique, that is each address will differ from all others in at least one bit position, it is known that the signals 1 or 0 will be up in at least one address bit position; namely, that position in which the two addresses differ. Thus by ANDing all pairs of signals (AND circuit 60) and ORing the outputs of all the ANDS 60 (OR circuit 62), the output P is energized whenever there is more than one match.

SUMMARY

The associative decode function replaces the conventional decode function resulting in a number of advantages. The first advantage is that with the associative decode function as an integral part of the memory address decoding, the address translation part of a mapping device for a time-sharing system becomes unnecessary. The associative decode function performed in this way uses bistable or monostable (read-only) associative storage cells. There are certain advantages in using read-only associative cells for storing the unique addresses of each word. First of all, with read-only cells there is no chance of destroying the information. In addition, with read-only addresses it is not necessary to initialize the unique addresses when power is first turned on in the system and furthermore the addresses are not destroyed when power is turned off.

While the invention has been particularly shown and described with reference to preferred embodiments thereof, it will be understood by those skilled in the art that various changes in form and details may be made therein without departing from the spirit and scope of the invention.

What is claimed is:

1. In a memory including a matrix of memory cells, rows of which correspond to words; columns of which correspond to bit positions within each word, and in which each memory cell is of a type which has a word drive line coupled to each cell in a row which upon energization produces a signal on a 0-bit sense line or a 1-bit sense line of a pair of such lines for each cell in said row depending upon the state of the cell, and in which said 0-bit sense lines in a column are coupled to a common bit sense 0 output, and said 1-bit sense lines in a column are coupled to a common bit sense 1 output, the improvement comprising:

an address portion of said matrix for storing an address field in each word stored in said memory, the bits in said address field set to represent unique addresses for each word, each address differing from each other word address by the state of at least one bit position in said field;

control means for energizing none, one, or a plurality of said word drive lines for reading words from said matrix thereby producing signals on the 1 lines or the 0 lines depending upon the state of the cells;

means coupled to the common bit sense 0 outputs and the common bit sense 1 outputs of said address portion for combining the 1 and 0-bit sense 0-of each column of said address portion to yield a first output in response to both bit sense outputs being energized in any pair, thus indicating the reading of a plurality of words;

means coupled to the common bit sense 0 output and the common bit sense 1 output of one column of cells in said matrix for combining the 1- and 0-bit sense outputs to yield a second output if either one of the outputs is energized thus indicating the reading of at least one word; and means combining said first output and said second output to thereby produce a third output whenever the first output is not energized and the second output is energized, to thereby yield a signal indicating the reading of only one word in said matrix.

2. The memory matrix of claim 1 wherein said address portion comprises read-only memory cells, set to nondestructively store said unique addresses.

PO-1050
(5/69)

UNITED STATES PATENT OFFICE
CERTIFICATE OF CORRECTION

Patent No. 3,602,899 Dated August 31, 1971

Inventor(s) Arwin B. Lindquist, Wilbur D. Pricer, Robert R. Seeber

It is certified that error appears in the above-identified patent and that said Letters Patent are hereby corrected as shown below:

Column 4, line 67, the word "0-" , second occurrence, should read -- outputs --.

Signed and sealed this 14th day of March 1972.

(SEAL)
Attest:

EDWARD M.FLETCHER,JR.
Attesting Officer

ROBERT GOTTSCHALK
Commissioner of Patents 623-2721-0